T. A. BOOR.
PLOW.
APPLICATION FILED APR. 4, 1919.
1,326,436.
Patented Dec. 30, 1919.
2 SHEETS—SHEET 1.
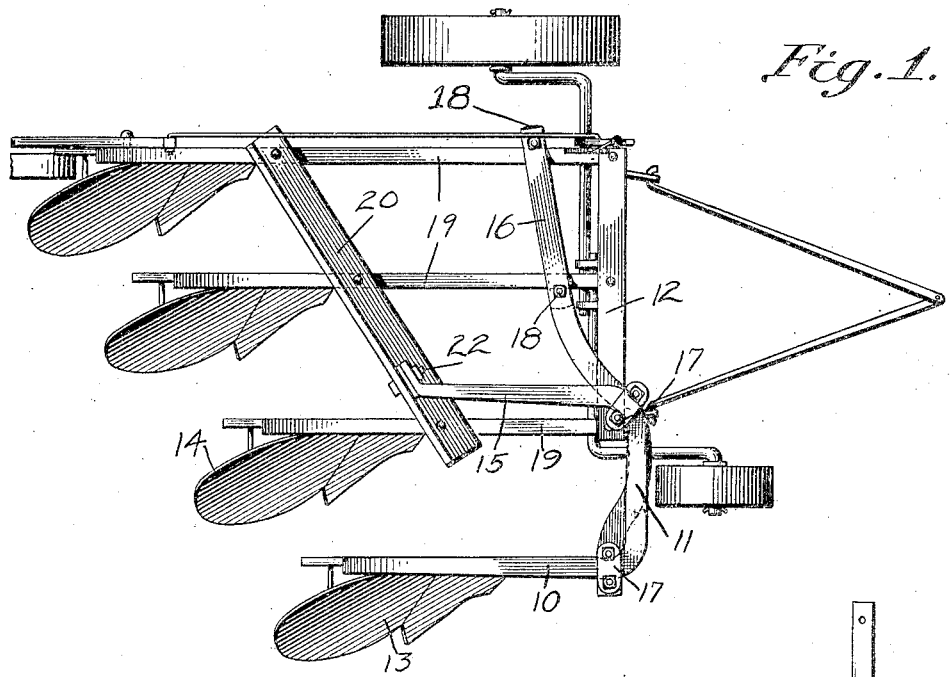
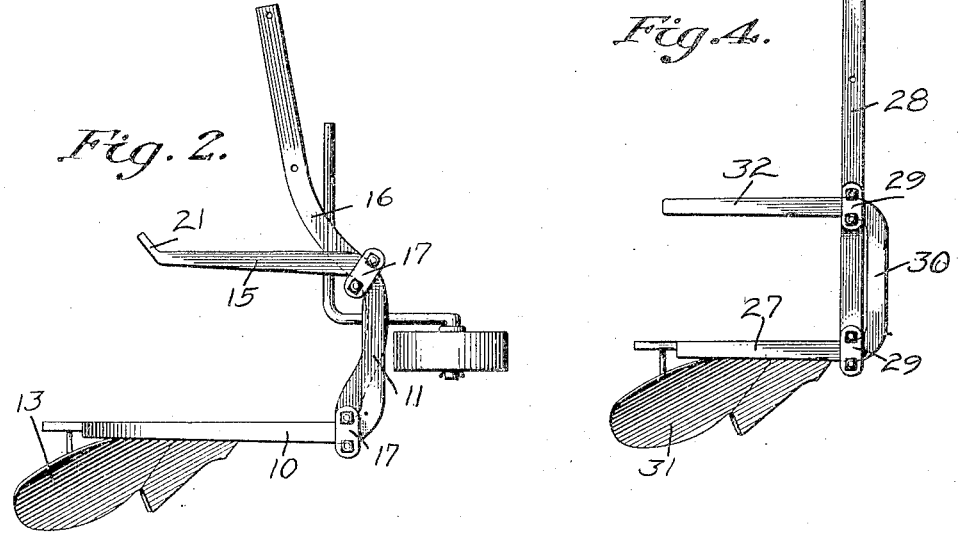
INVENTOR
T. A. BOOR
BY
ATTORNEYS

T. A. BOOR.
PLOW.
APPLICATION FILED APR. 4, 1919.

1,326,436.

Patented Dec. 30, 1919.
2 SHEETS—SHEET 2.

INVENTOR
T. A. BOOR
BY
ATTORNEYS

UNITED STATES PATENT OFFICE.

THEODORE A. BOOR, OF ASHVILLE, OHIO.

PLOW.

1,326,436.  Specification of Letters Patent.  Patented Dec. 30, 1919.

Application filed April 4, 1919. Serial No. 287,464.

*To all whom it may concern:*

Be it known that I, THEODORE A. BOOR, a citizen of the United States, and a resident of Ashville, in the county of Pickaway and State of Ohio, have invented certain new and useful Improvements in Plows, of which the following is a specification.

My present invention relates generally to plows, and is more particularly a plow attachment for gang plows, to supply an extra plow for use in the corners of fields, the main object of my invention being to eliminate corner trouble in tractor plowing, and by so doing, to encourage the use of tractors on the farm.

My improved attachment which is equally useful in connection with two or more plow outfits, is to supply an extra plow on one side of a gang plow, for the purpose of plowing a furrow at the corner or corners of a field in such manner that the sides of the field may be kept straight and a perfect curve maintained at the corner, without missing any sod, without stopping, and thus with less difficulty, greater speed, and complete satisfaction.

Figure 3:
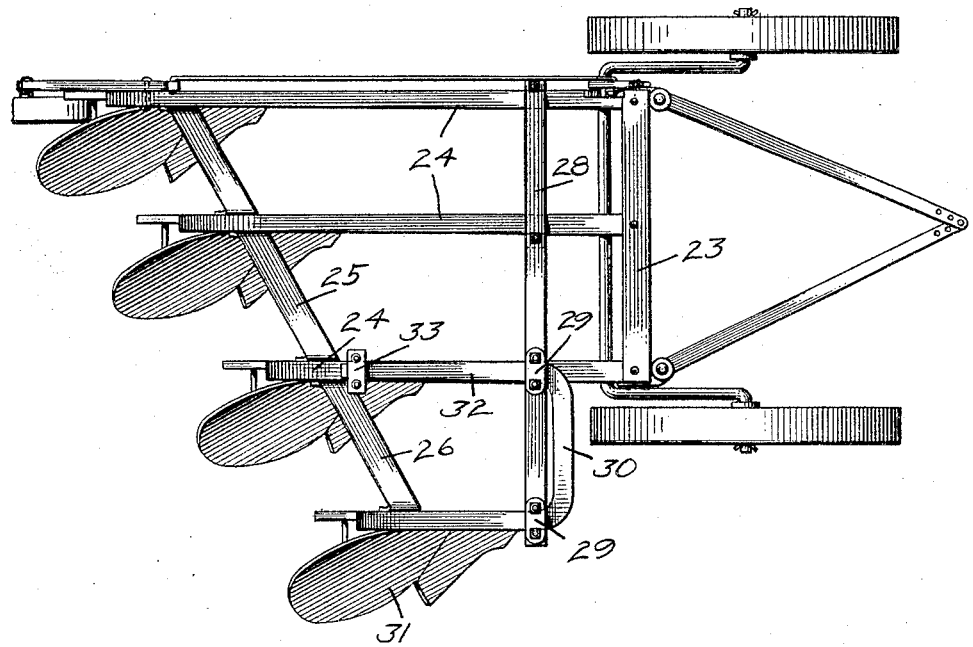
Figure 5:
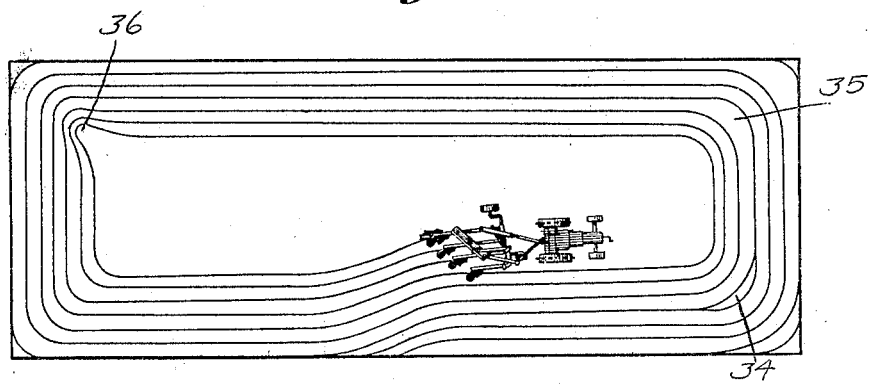

In the accompanying drawings illustrating my present invention, and forming a part of this specification, Figure 1 is a top plan view of a gang plow of one type, provided with my improvement, Fig. 2 is a top plan view of the attachment proposed by my invention for use in connection with the gang plow of Fig. 1, Fig. 3 is a top plan view of another form of gang plow provided with my invention, Fig. 4 is a top plan view of the attachment proposed by my invention on the form of gang plow shown in Fig. 3, and Fig. 5 is a diagrammatic plan illustrating the use of my invention in connection with the plowing of a field.

Referring now to these figures, and particularly to Figs. 1 and 2, my invention proposes an attachment for gang plows of either two or more blades, for the purpose of supplying an extra plow at one side of its normal series, and to this end the attachment consists of a horizontally disposed U-shaped supporting frame 10, the cross bar 11 of which is disposed forwardly with respect to the frame 12 of the gang plow, and one of the extensions of which U-shaped frame 10 supports the additional blade 13, which supplements the several blades 14 normally carried by the frame 12 of the gang plow.

The opposite extension of the frame 10, indicated at 15, is secured to the frame 12 of the gang plow, and in order to further rigidly support the frame 10 in its horizontal extension beyond one side of the frame 12 of the gang plow, a connecting bar 16 is utilized, one end portion of which is securely connected by clamps and the like, 17, to the two extensions of the frame 10 immediately adjacent to its cross bar 11.

Thus, as seen in Fig. 1, wherein the connecting bar 16 is curved to project slightly in a rearward direction beyond one side of the U-shaped frame 10, the said connecting bar is clamped by hook bolts and the like, as seen at 18, to certain of the longitudinal bars 19 of the gang plow frame 12, and in connection with this same type of gang plow as seen in Fig. 1, whose frame 12 has an inclined beam 20 connecting the rear portions of the several longitudinal bars 19, the rear end of the extension 15 of frame 10, opposite to that supporting the plow blade 13, may have an angular foot 21 to be bolted securely by a bolt 22 to a portion of the said connecting beam 20.

In connection, however, with a gang plow of the type shown in Fig. 3, whose frame 23 includes longitudinal bars 24, the rear portions of which are simply connected by spacing arms 25, an additional spacing arm as indicated at 26, is utilized in connection with my improved attachment, the U-frame of which is indicated at 27 in Figs. 3 and 4, its connecting bars 28 being in this instance straight, although clamped by clamps 29 which engage the U-frame 27 adjacent to its cross bar 30 just as previously described in connection with Figs. 1 and 2.

In the form shown in Figs. 3 and 4, the extra plow blade 31 is supported by one extension of U-frame 27 similarly to the blade 13 of Figs. 1 and 2, but the other extension 32 of frame 27 in the form of Figs. 3 and 4, is clamped by means of a clamp 33 adjacent its extremity, to the adjacent longitudinal bar 24 of the gang plow frame 23 as clearly seen in Fig. 3.

The extra plow proposed by my improvement in connection with a gang plow embodying two or more plow blades, is designed particularly for use in properly finishing the corners of plowed fields, without difficulties usually incident thereto in connection with tractor plowing. It is a well known fact that in tractor plowing, the corners of a field cannot be finished with the ordinary gang plow without stopping to pass the corner or skipping more or less ground.

In Figs. 1 and 3, as well as in the diagram of Fig. 5, I have shown a normal three blade gang plow, the blades of which are supplemented by the extra blade of my improved attachment, although the latter is not used in plowing the sides of a field but simply run into a previously made furrow at one side, its function being reserved for the corner where it will finish out and turn the extra furrow indicated at 34 in Fig. 5, while the sides are maintained straight and the tractor proceeds steadily, which would otherwise result in either the skipped space 35 shown at one corner, or would necessitate the undesirable irregularities in the sides as seen at 36 at another corner when plowing the same size furrow entirely around the corner without missing ground or covering ground.

It is thus obvious that my invention supplies a considerable need and will result in very desirable encouragement of tractor plowing. It is furthermore obvious that my invention while of a simple, inexpensive construction is strong and durable in use, will avoid the necessity of loss of time in patching up and finishing corners, where properly formed corners are insisted upon, as well as avoiding irregular sides, and improperly formed corners, in other cases.

It is also to be noted in connection with my improvements that the plow wheel must be put on the land instead of in the furrow where the extra plow as provided by my invention is intended to run.

I claim:

An attachment for gang plows, consisting of a U-shaped frame, one extension of which is attachable to the frame of the gang plow, a plow blade carried by the other extension of said U-frame, and a laterally projecting attaching bar one end of which is secured at spaced points to the extensions of said U-frame adjacent to its cross bar, and the other end of which projects transversely of the gang plow is attachable to portions of the frame of the gang plow at spaced points.

THEODORE A. BOOR.